June 1, 1926.                       1,587,159
C. W. JORDAN
AUTOMOBILE SIGNAL
Filed August 24, 1925
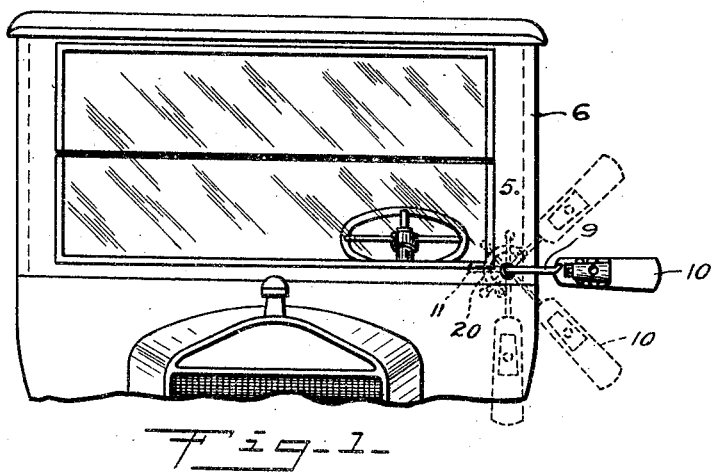
Fig. 1.
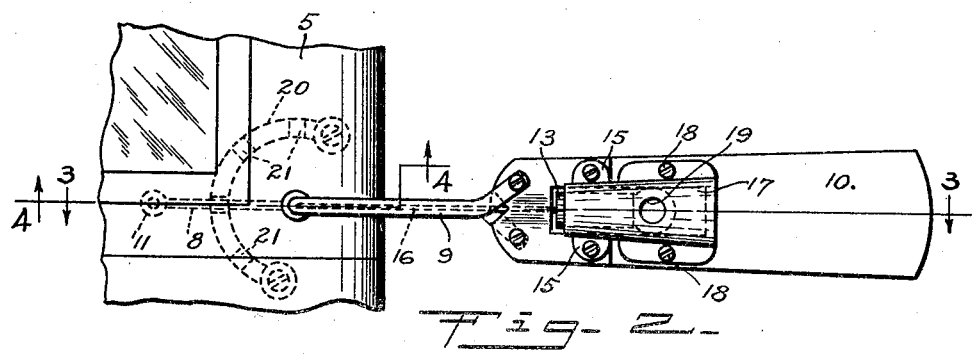
Fig. 2.
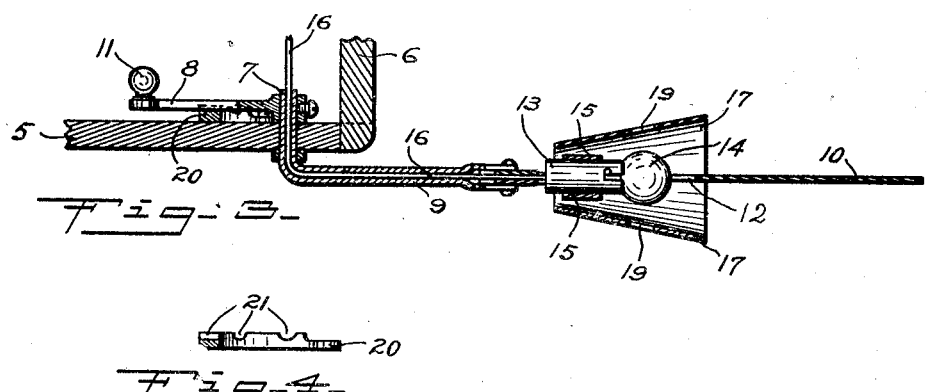
Fig. 3.
Fig. 4.
Inventor
CLAYTON W. JORDAN.
Witness:
R. J. Momiehl.
By Willard Eddy,
Attorney Patented June 1, 1926.

1,587,159

UNITED STATES PATENT OFFICE.

CLAYTON W. JORDAN, OF LINCOLN, NEBRASKA, ASSIGNOR TO RALPH E. HARRINGTON, OF LINCOLN, NEBRASKA.

AUTOMOBILE SIGNAL.

Application filed August 24, 1925. Serial No. 51,924.

My invention relates to that class of signaling devices which are commonly applied to automobiles for the purpose of indicating to observers the positions and intended movements of such vehicles, and which individually comprise a semaphore arm, means for actuating and setting the arm, an electric lamp carried by the arm, and means for supplying current to the lamp. It is the main object of the invention to utilize in a signaling device of this kind a single electric lamp as a parking light and as a guide light and also as means for illuminating the semaphore arm; to render the single parking light, which is carried by the arm, visible from before and from behind the vehicle; to illuminate both sides of the semaphore arm with light proceeding from a single bulb carried by the arm; and at the same time to adapt the signal, when set in its parking position, to direct rays of light downward to the running board and the ground at the side of the automobile. To accomplish these results I incorporate in my improved automobile signal as parts thereof a semaphore arm which is pivotally attached to the body of the vehicle and has a median longitudinal slot, means for pivotally turning and setting the arm, a hood which spans the slot on the opposite sides of the arm, an electric lamp within the hood, and specially arranged means for conducting current to the lamp.

In said drawings, illustrating the best manner in which I have contemplated applying the principles of the invention, Fig. 1 is an incomplete front elevation of an automobile passenger car of common type and description, which is provided with a signal constructed and applied in accordance with these principles. Fig. 2 is an enlarged portion of Fig. 1. Fig. 3 is a horizontal section on the section line 3—3 of Fig. 2. Fig. 4 is a detail on the section line 4—4 of Fig. 2.

In these drawings the numeral 5 denotes the front wall of a wind-shield frame which is part of the car body, while 6 denotes the adjoining left side wall of the same frame. The tubular rockshaft 7, which is journaled in the wall 5 near the wall 6, is provided with the radial lever handle 8 within the car and with the external tubular rockarm 9. To the outer and free end of this rockarm is secured the semaphore arm 10, extending in the same radial direction from the rockshaft. The semaphore arm, being a thin light-colored plate, is adapted to be swung in its own vertical plane by manipulation of the finger-piece 11 on the free end of the lever handle 8. It has, midway of its width, the longitudinal slot 12 for the accommodation of the electric lamp socket 13 and lamp bulb 14, which are disposed coaxially therein, protrude from the socket at the opposite sides of the arm, and are held in position by the straps 15 and 15 which hug the lamp socket and are bolted to the arm on its opposite sides respectively. By the conductive wires 16, which occupy the tubular rockshaft 7 and the tubular rockarm 9, as shown in Fig. 3, the lamp socket is connected with an ignition battery, or other source of current, and with a manually operated circuit breaker, which are within the car body and not shown in the drawings. The hood surrounding the lamp is a hollow metallic shell shaped somewhat like the frustum of a cone and having its internal surface adapted by polishing or otherwise to reflect light from the lamp outward onto the semaphore arm. It consists of two concave reflectors, 17 and 17, arch-like, duplicates of each other, which are secured to opposite sides of the semaphore arm, in mutual registration, by the bolts 18. It has in its opposite sides the two holes, or windows 19 and 19, alined with the bulb 14 and adapted to throw light, preferably red, forward and backward of the arm respectively. The arcuate bar 20 having the notches 21 is secured to the inside of the car, in a position to engage and to hold in any desired position of adjustment the lever handle 8, which is slidable thereon by hand from notch to notch.

In the operation of my improved signal the semaphore arm when not in use, is set and permitted to hang in the dependent vertical position shown in dash lines in Fig. 1. To signify that the car is either parked or is about to stop, this arm is set in the oblique downward position similarly shown in the same figure; to indicate that the car is about to turn to the left the arm is extended horizontally as shown in full lines; and to show that the car is about to turn to the right the arm is set in the oblique upward position indicated in dash lines.

By manipulation of the finger-piece 11 the semaphore arm is swung to any one of these positions, as the driver may elect; and by engagement of the lever handle with and in the appropriate notch 21 of the arcuate bar 20 the arm is retained in the given position. By night the lamp not only illuminates both sides of the semaphore arm both directly and by light reflected from the inside of the hood, but is directly visible through the windows 19 and 19 to observers in front of the car as well as to those behind.

I claim as my invention—

In a signaling device of the specified class, a semaphore arm having a central longitudinal slot and a horizontal axis of oscillation, an electric light bulb coaxial with the slot, and a pair of arch-like windowed reflectors, duplicates of each other, severally spanning the slot, and bolted to opposite sides of the semaphore arm.

Witness my signature at Lincoln, Nebraska, August 19th, 1925.

CLAYTON W. JORDAN.